(12) United States Patent
McCarthy (10) Patent No.: US 9,913,456 B2
(45) Date of Patent: Mar. 13, 2018

(54) ROPING DUMMY APPARATUS (71) Applicant: John Nolan McCarthy, San Antonio, TX (US)

(72) Inventor: John Nolan McCarthy, San Antonio, TX (US)

(*) Notice: Subject to any disclaimer, the term of this patent is extended or adjusted under 35 U.S.C. 154(b) by 461 days.

(21) Appl. No.: 14/148,391

(22) Filed: Jan. 6, 2014

(65) Prior Publication Data
US 2014/0193785 A1 Jul. 10, 2014

Related U.S. Application Data (60) Provisional application No. 61/749,160, filed on Jan. 4, 2013.

(51) Int. Cl.
*A01K 15/00* (2006.01)
*A63B 69/00* (2006.01)

(52) U.S. Cl.
CPC ............ *A01K 15/00* (2013.01); *A01K 15/003* (2013.01); *A63B 69/0068* (2013.01)

(58) Field of Classification Search
USPC ........................................................ 434/225
See application file for complete search history.

(56) References Cited

U.S. PATENT DOCUMENTS

| | | | | |
|---|---|---|---|---|
| 4,932,988 A | * | 6/1990 | Lutterbach | B01D 46/00 55/356 |
| 7,430,990 B1 | * | 10/2008 | Copenhaver | A01K 15/02 119/839 |
| 2005/0282128 A1 | * | 12/2005 | Brinkerhoff | A63B 69/0068 434/247 |
| 2007/0062832 A1 | * | 3/2007 | Fomby | A45C 5/08 206/403 |
| 2009/0014960 A1 | * | 1/2009 | Brackens | A63B 69/0068 273/406 |

OTHER PUBLICATIONS

Heel-O-Matic, "Bones—Heading Dummy", accessed at: http://www.heelomatic.com/product/bones-heading-dummy/. (Accessed on May 18, 2016).*
Equisearch, "2009 Holiday Gift Guide", accessed at: http://www.equisearch.com/article/2009-holiday-gift-guide-16650 (published Dec. 8, 2009).*

* cited by examiner

Primary Examiner — James Hull
(74) Attorney, Agent, or Firm — Jackson Walker LLP (57) ABSTRACT A team roping dummy that encourages more correct roping. The dummy head can be rotated to different angles to match that of a typical running steer. A blocker post extends vertically out of the neck, which makes the roper deliver the loop at the proper plane. The blocker post further causes the roper to rope the horns in the center of the loop versus roping with the front or back edge of loop. The back legs extend at proper angle of heel loop swing, causing the roper to match the angle of the loop during its swing to the angle of the legs and provides a visual line to match the plane of the loop.

19 Claims, 8 Drawing Sheets

ROPING DUMMY APPARATUS

This application is based upon and claims priority from U.S. provisional application Ser. No. 61/749,160, which is incorporated herein by reference.

BACKGROUND OF THE INVENTION

Field of the Invention

Applicants' invention relates to a device for practicing and learning proper roping techniques for team and steer roping, and methods for using same. More particularly, it relates to a roping dummy.

Background Information

Roping cattle from horseback is a historical process that many recognize. Branding and doctoring the cattle necessitated that cowboys capture the animals, and early ranches where this process completed without the benefit or aid or pens and specialized shoots necessitated a very specific skill of the cowboys, as well as necessitating specialized equipment. Part of this specialized equipment included development of the western saddle. These skills and equipment in practice in many places yet today.

Many people are also familiar with the transition that was made of the various roping styles to rodeo events. One of the roping styles that found its way to the rodeo arena, and continues to grow in popularity, is the sport of team roping. Team roping, as its name implies, is an event that is completed by two ropers. The first roper, called the header, ropes the animals first and either ropes the animal around the neck or, more preferably, around the horns. The second roper, called the healer, waits for the header to slow the animal and turn the animal at an approximate 90-degree angle before roping the animal's hind legs.

In a typical rodeo run, the steer is placed in a starting gate called a shoot. Behind the shoot is a three-sided area called the box in which the header and healer start on their horses. Traditionally, the header and healer were in a double-box to the rear and on the right side of the steer. However, in the last few decades, it has become most common that the header starts in a "box" to the rear and on the left side of the steer, while the healer starts in a "box" to the rear and on the right side of the steer. The header calls for the steer to be released by nodding his head or otherwise indicating his readiness. The steer is given a designated head start, called a score, and the ropers (or at least the header) are required to wait in the box until the steer reaches a certain point, at which time they can leave the box in pursuit of the steer.

Once the ropers leave the box, their horses chase the steer an attempt to close the distance between the animals. As the header gets closer to the steer, he generally attempts to arrive to the rear of the animal close enough to rope it and slightly to its left. Meanwhile, the healer rates his horse back and to the right of the steer such that he is ready to close the gap after the header ropes, but also he can attempt to help keep the steer from ducking to the right.

Once the roper has gotten close enough to the steer to rope, he ropes the steer around the horns or neck and pulls his slack to tighten the loop around the steer's horns. He then takes a couple of wraps around his saddle horn with the free end of the rope (the "daily") so that the steer is effectively attached by the rope to the saddle of the horse and rider. The header then signals his horse to slow which also slows the steer slightly. Then he turns his head horse off to the left at approximately a 90-degree angle such that the steer is then pulled to the left as well. Once the steer changes directions, the healer is then allowed to take his throw at the heels of the steer. He attempts to rope both hind feet, although roping one hind foot is a legal catch as well, albeit one with a penalty. Once the healer ropes the hind feet, he dallies his rope as well and stops his horse. The header continues until he takes the slack out of his rope, then turns his horse to face the steer, leaving the steer immobilized between the two horses.

As with most sports and activities, means for practicing the craft are often used. For team or steer roping, a common practice apparatus is a mechanical or modeled steer (referred to commonly as a "dummy"). The dummy is used to learn and practice roping techniques.

SUMMARY OF THE INVENTION

The present invention is for a practice roping dummy.

The present invention provides a novel apparatus that provides for:

a. a relatively compact main body with collapsible legs, removable head, and internal body storage for head;

b. a means for allowing the head to be rotated to different angles (which may be controlled by an octagonal post);

c. head/nose angle matches that of a typical running steer, not a standing steer;

d. neck opening sloped as actual steer;

e. hump on back same as shoulders of live steer, which makes roper deliver at the proper angle to achieve the rope curling on the back (If no hump a loop with less angle will work, when in live roping the rope would hit the shoulder and promote a waving off of the loop.);

f. legs rotate back onto body for storage, which also creates rope storage compartments on both sides of main body;

g. legs collapse toward one another under the pressure of a tightened rope, and re-expand after rope is loosened, which aids in the rope's loop expansion and ease of removal;

h. leg height off ground promotes proper delivery of the bottom strand of loop;

i. blocker post extends vertically out of neck, which makes the roper deliver the loop at the proper plane;

j. the blocker post further causes the roper to rope the horns in the center of the loop versus roping with the front or back edge of loop;

k. back legs extend at proper angle of heel loop swing, causing the roper to match the angle of the loop during its swing to the angle of the legs and provides a visual line to match the plane of the loop;

l. opening of shape between body and back legs, creates window at proper delivery angle;

m. keeps ropers loop angle correct when roping on the ground, and promotes rope tip entering first or loop may be blocked by body if incorrectly delivered, and n. removable and rotatable horns allowing for different horn sizes, shapes, and angles.

DETAILED DESCRIPTION OF THE PREFERRED EMBODIMENT

Figure 1:
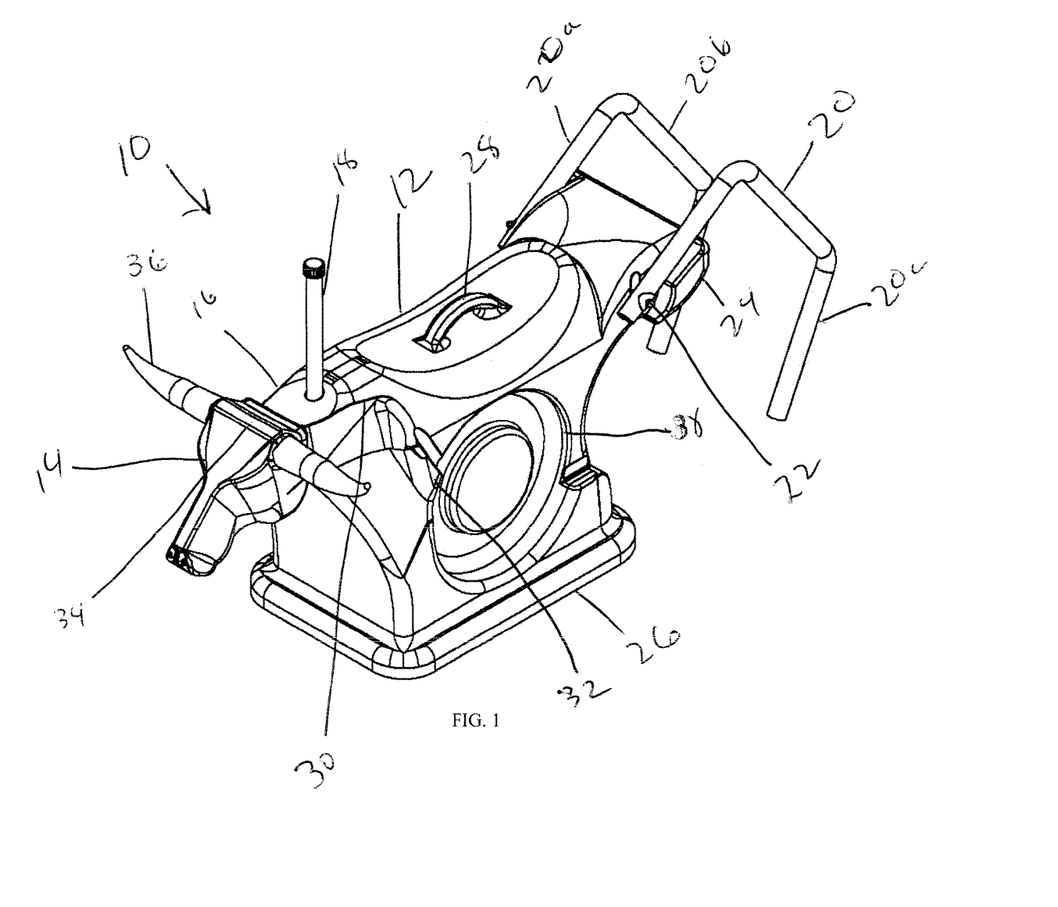
FIG. 1 is a perspective view of a first side of the roping dummy.

Referring to the figures, FIG. 1. illustrates a perspective view of a first side of the roping dummy 10. The body 12 is generally shaped like a steer or bovine. A head 14 is attached to the body 12 at the front end of the body 12. The body 12 front end maybe further delineated into a neck portion 16 and a shoulder portion 30. Thus, like a real steer, the front end of the body is made up of the shoulder and neck, with the head attached to the neck. At the bottom of the body 12 is a base 26. The base 26 provides a stable footing for the dummy 10.

The body 12 may be hollow and allow for storage within it. Additionally, the hollow body makes the dummy 10 lighter and more easily transportable.

The rear end of the body 12 has a rear portion 24 that extends upwardly and rearwardly from the back end of the base 26. The legs 20 are attached at a pivot point 22 in the body rear portion 24. In this figure, the legs 20 are shown in a rearward position. The legs 20 are attached to the body rear portion 24 using a pin connector or other means so as to allow the legs 20 to rotate about a horizontal axis of the rear portion 24 that extends from one side to the other of the body 12. A leg 20 is attached to a pivot point 22 at each side of the body 12. This allows the legs 20 to swing forward and back relative to the dummy 10, again similar to the motion of the back legs of a running steer. The legs 20 may be designed in a somewhat "C" shape. The higher portion of the legs 20 and attached to the rear portion 24 is a upper, generally horizontal member 20a. Attached to the end of the generally horizontal member 20a opposite the pivot point is a generally vertical member 20b. Attached to the end of the generally vertical member 20b opposite the general horizontal member 20a is a lower angle member 20c. As a training tool, this leg shape helps train and practice the user to throw a proper heel loop. As shown in the drawing below, a change in the leg angle allows for a continuation of the proper swing angle. The user can continue to swing at the proper delivery angle as the legs move. This also gives a shape somewhat similar to an actual steer.

Also illustrated in FIG. 1 is a blocker rod 18 that is attached at a first end to the body 12. More specifically, if the body is delineated into a shoulder portion 30 and a neck portion 16, then the rod 18 is attached to the body 12 in the neck 16 or shoulder 30 areas. Generally, on a live steer this would be located at approximately the base of the neck. The blocker rod 18 extends vertically from the body 12. The second end of the rod 18 is higher than the crown, or highest point, 34 of the head 14. The rod 18 is unnatural but forces the user to increase the height of the user's swing position. The rod 18 also forces the user to create "dip" or "drop" in their loop. Similar to having arch on a basketball shot, the loop thrown to settle down about the head 14 or horns 36 over the rod 18 tends to encourage a higher percentage catching throw as compared to a flat swing and delivery angle. Using the rod 18 forces the user to use an increase their angle of throw so as to achieve practice from the ground that is more like throwing in a steer from horseback. When the distance to the target (the head 14 or horns 36) is increased, the loop swing angle and height of delivery must be increased to catch consistently on live cattle. Prior art dummies without the rod 18 allow flat angles of throw to be successful and do not promote swing change.

The rod 18 is located such that when aligned with the base of the right or it acts as a position locator for proper angle to the dummy 10, which works best on live cattle. If a lesser or greater angle is used on real cattle it takes away from the optimal "handle" of the roped steer. The rod 18 also encourages the user to rope from an optimal angle from the steer or dummy 10. In a team roping run, the header ropes the forms or head of the steer, then dallies in terms the user's horse to the left at a 90° angle to turn the steer in that direction. This is called the "handle." Ideally, the roper should rope the steer at a 45° angle so that when the horse turns off the steer is handled smoothly to the left. If the steer is roped at a greater or lesser than 45° angle the steer tends to get jerked in their body does not travel in a smooth arc making it harder for the healer to rope. The placement of the rod 18 encourages the user to rope at a 45° angle because the rod 18 will tend to block the practice throw if the user is not at 45°. In this manner, the rod 18 forces proper planning and angle, and discourages throws released before or after reaching an ideal angle. This gives the user a reference of position from which to practice roping. Because the rod 18 will block and improper throw, it encourages timing so as to increase the user's patients to allow the loop tip to travel towards the target before releasing.

The shoulder portion 30 may tend to be generally flat, limiting the less perfect loops from working in encouraging the development of a high percentage loop. Also, to simulate a steer that lowers its head during a run, the crown, or highest point, 34 of the head 14 may be lower than the highest point of the shoulder portion 30.

For ease of use, and indentation 38 may be included in the side of the body 12. This indentation 38 acts as a lariat rope holder and is sized to accept a coiled lariat rope. The lariat rope may be held in place in the indentation 38 by a strap, door, bar, or other similar blocking means. Additionally, it is anticipated that the legs 20 can rotate forward and be locked in a forward position by a locking means 32. In this manner, the legs 20 can hold a lariat rope in place in the indentation 38.

At the top of the body 12 may be a handle 28. The handle 28 can be used to carry the dummy 10 to a desired location. Ideally, the handle 28 will be positioned so that when the dummy 10 is lifted using the handle 28 the dummy 10 is balanced.

Figure 2:
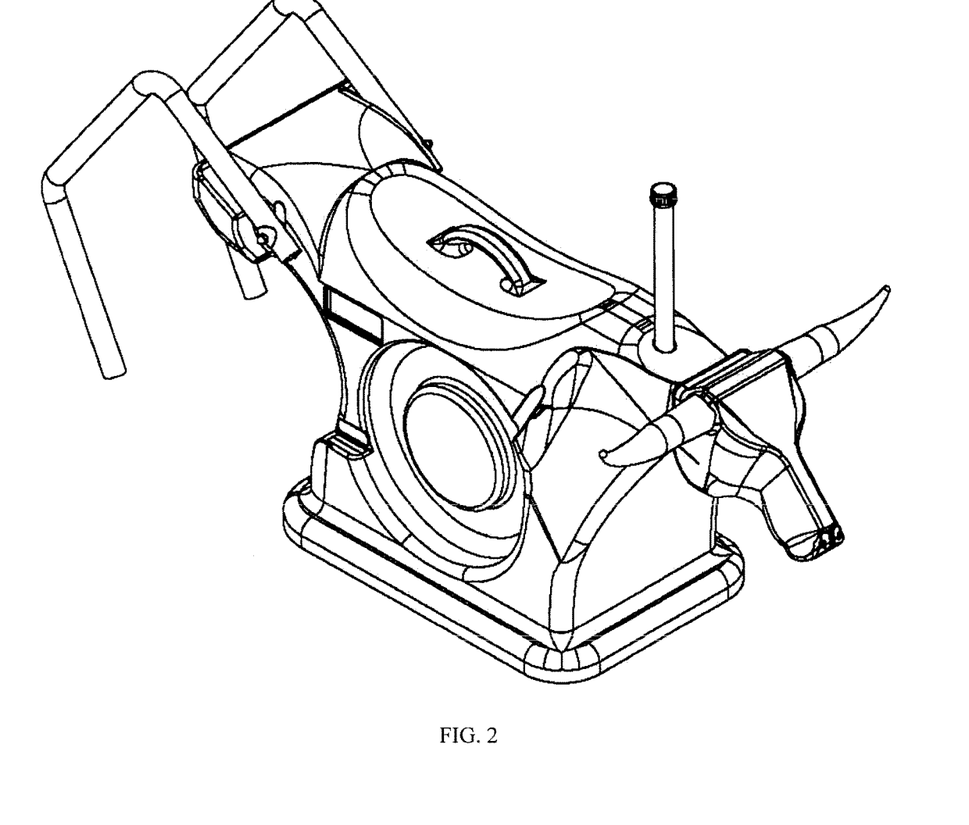
FIG. 2 is a perspective view of a second side of the roping dummy.

FIG. 2 shows a perspective view of the second side of the roping dummy.

Figure 3:
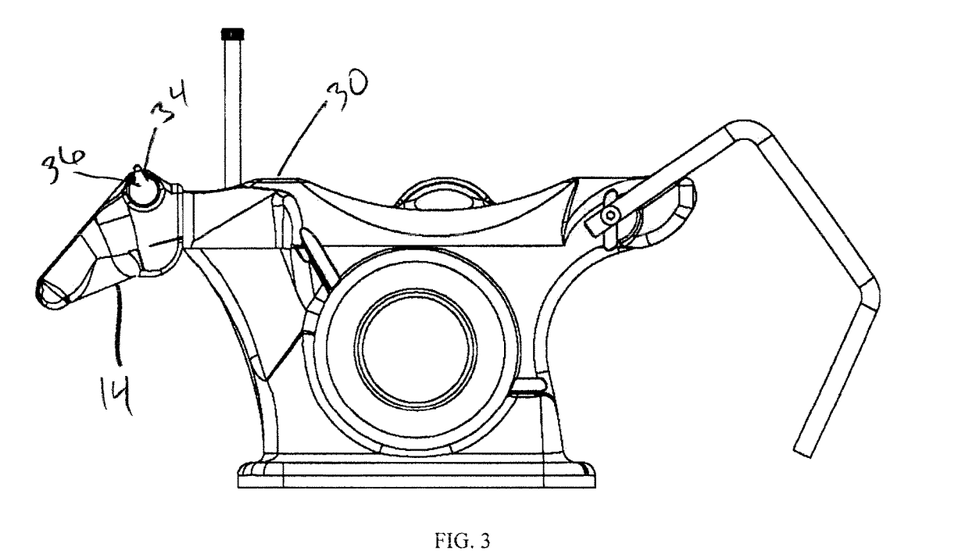
FIG. 3 is a side view of a first side of the roping dummy.

FIG. 3 is a side view of a first side of the roping dummy with the legs in a rearward position. In this figure the head 14 is shown in a raised and level position. However, the head 14 may be positioned such that the crown 34 is lower than the shoulder 30. Additionally, the head 14 may be rotated such that one of the horns 36 is angled downwardly in the opposite horn 36 is angle upwardly at a desired angle.

Figure 4:
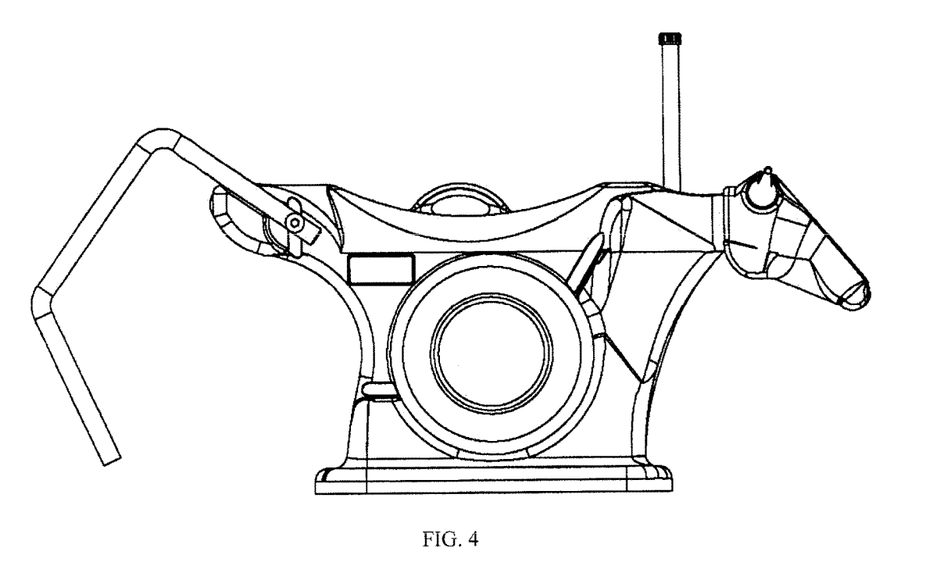
FIG. 4 is a side view of a second side of the roping dummy.

FIG. 4 is a side view of a second side of the roping dummy.

Figure 5:
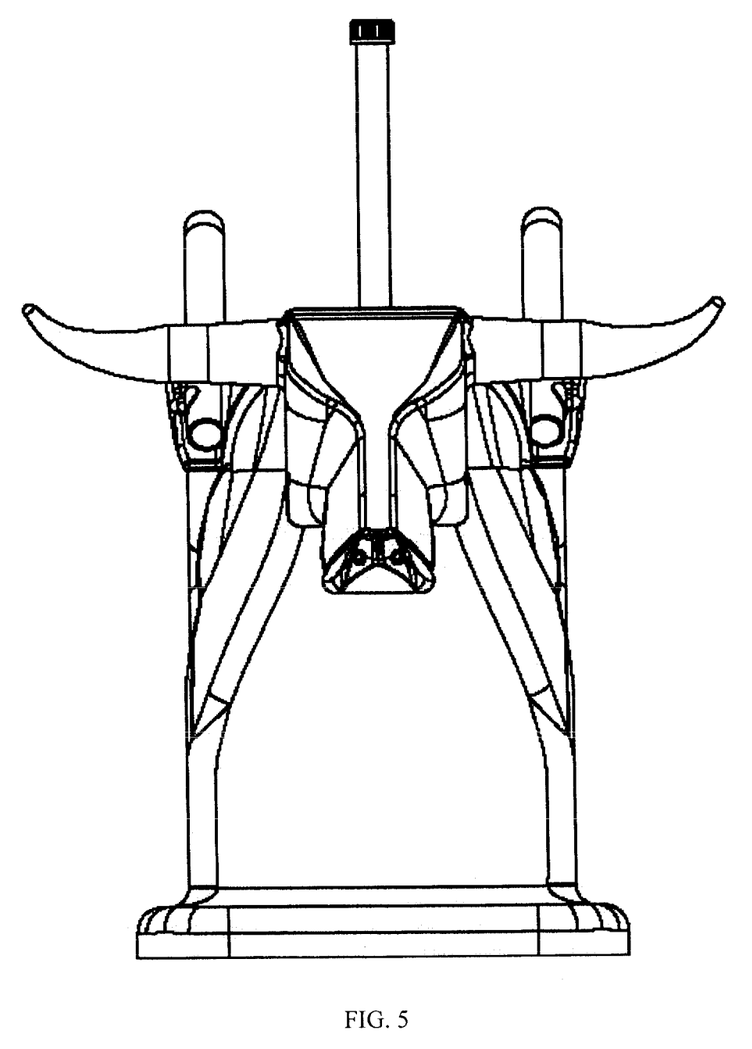
FIG. 5 is a front view of the roping dummy.

FIG. 5 is a front view of the roping dummy. This figure clearly shows how the second end of the rod 18 is higher than the head 14 or the horns 36.

Figure 6:
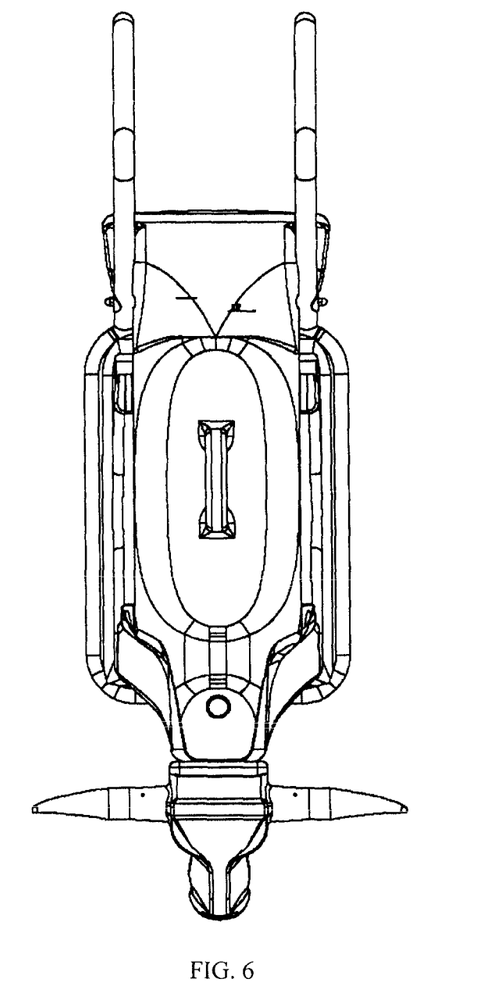
FIG. 6 is a top view of the roping dummy.

FIG. 6 is a top view of the roping dummy.

Figure 7:
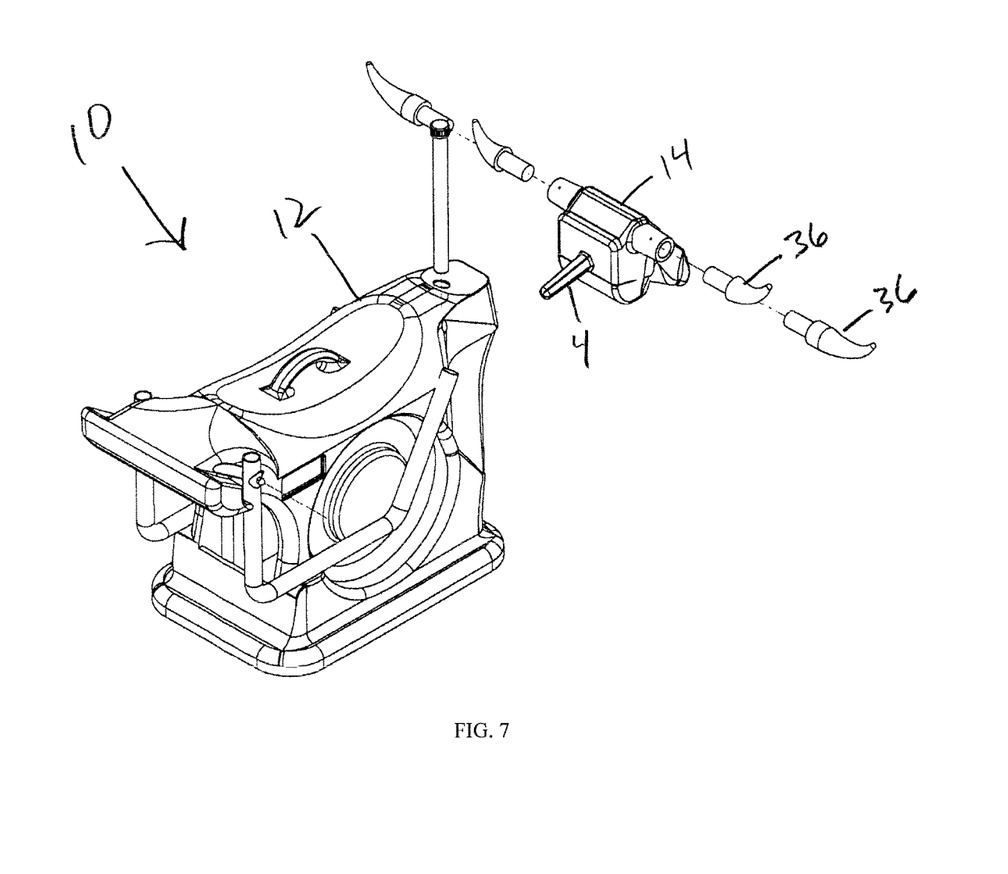
FIG. 7 is a perspective, partially exploded view of a second side of the roping dummy.

FIG. 7 is a perspective, partially exploded view of a second side of the roping dummy. This figure illustrates how the head 14 may be attached to the body 12. In this embodiment, the back of the head 14 has a post 40 that may have flat surfaces allowing the head to rotate about the longitudinal axis of the post 40, but the flat services tend to keep the head at a specific angle chosen by the user. Additionally, this figure illustrates that the horns 36 may be of different sizes and shapes. The horns 36 can be removable from the head 14 without damaging either the head 14 or the horns 36 so that varying shaped and sized horns 36 can be used with the dummy 10.

Figure 8:
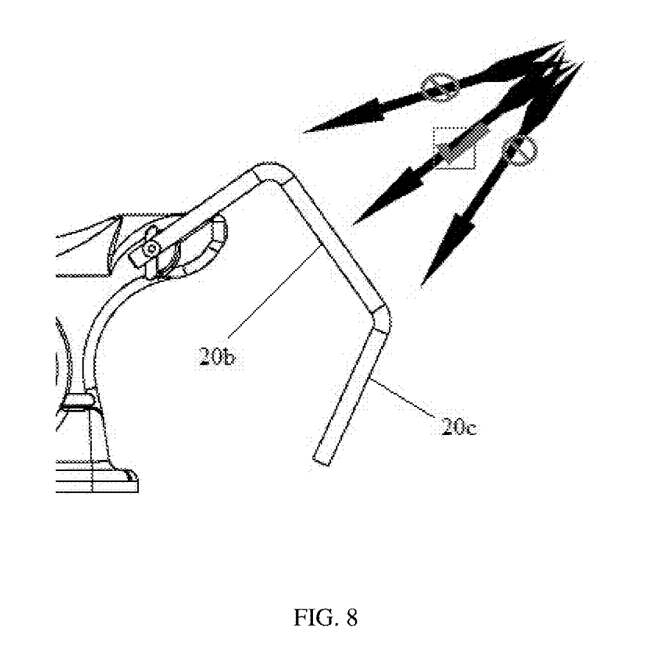
FIG. 8 is a schematic diagram illustrating the proper angle of a heel loop.

FIG. 8 illustrates how the shaped legs encourage the user to throw the heel loop at the proper angle. The arrows illustrate improper and proper angles. At the proper angle, the top portion of the loop is thrown generally perpendicularly against the generally vertical member 20*b*, while the bottom portion of the loop passes under the end of the lower angle member 20*c*.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A dummy for practicing team roping comprising:
a body shaped generally like a steer, said body having a front end and a back end;
a head with horns attached to the front end of said body;
a hind leg attached to said body at a rear end; and
a rod having a length and width dimension, wherein the length is substantially greater than the width, the rod with a first end attached to said body at the front end, said rod extending vertically from said body, wherein a second end of said rod is higher than said horns and said head relative to a surface on which the dummy is positioned.

2. The dummy of claim 1 further comprising:
a horn attached to said head.

3. The dummy of claim 1 further comprising: said horn being removable from said head without damaging said head or said horn.

4. The dummy of claim 1 further comprising: a neck portion of said body at the front end of said body; said head attached to said body at a distal end of said neck portion of said body; and the attachment position of said rod on said body being on the neck portion.

5. The dummy of claim 4 further comprising:
a shoulder portion of said body, wherein said neck portion of said body is attached to at said shoulder portion of said body;
said head having a highest point;
said shoulder portion having a highest point; and
wherein the highest point of said head is lower than the highest point of said shoulder portion relative to a surface on which the dummy is positioned.

6. The dummy of claim 1 further comprising:
a handle attached to a top side of said body.

7. The dummy of claim 1 further comprising:
a generally circular indentation on a side of said body sized to receive a lariat rope.

8. The dummy of claim 1 further comprising:
said body being hollow.

9. The apparatus of claim 1, further comprising:
said head being rotatable about a horizontal axis of said body such that a crown of the head can be positioned to a desired angle relative to the ground.

10. A dummy for practicing team roping comprising:
a body shaped generally like a steer, said body having a front end and a back end;
a head with horns attached to the front end of said body;
a hind leg attached to a rear portion of said body; and
said leg rotatable about a horizontal axis of said body rear portion;
a rod having a length and width dimension, wherein the length is substantially greater than the width, the rod with a first end attached to said body at the front end, said rod extending vertically from said body, wherein a second end of said rod is higher than said horns and said head relative to a surface on which the dummy is positioned.

11. The apparatus of claim 10, further comprising:
said leg further comprised of an upper, generally horizontal member having a first end and a second end, a generally vertical member having a first end and a second end, and a lower, generally horizontal member having a first end and a second end;
wherein said upper, generally horizontal member second end is attached to said generally vertical member first end, and said generally vertical member second end is attached to said lower, generally horizontal member first end; and
said upper, generally horizontal member first end is attached to said rear portion of said body.

12. The dummy of claim 10 further comprising:
a handle attached to a top side of said body.

13. The dummy of claim 10 further comprising:
a base at the bottom of said body;
wherein said body rear portion extends upwardly and rearwardly from said base.

14. The dummy of claim 10 further comprising:
a generally circular indentation on a side of said body sized to receive a lariat rope.

15. The dummy of claim 14 further comprising:
said indentation positioned such that when said leg is rotated to a forward position, said leg is over said indentation; and
a locking means to keep said leg in said forward position.

16. The dummy of claim 15 further comprising:
a handle attached to a top side of said body.

17. A dummy for practicing team roping comprising:
a body shaped generally like a steer, said body having a front end and a back end;
a head with horns attached to the front end of said body;
a hind leg;
a rod having a length and width dimension, wherein the length is substantially greater than the width, the rod with a first end attached to said body at the front end, said rod extending vertically from said body, wherein a second end of said rod is higher than said horns and said head relative to a surface on which the dummy is positioned;
horns attached to said head, said horns being removable from said head without damaging said head or said horns;
said head being rotatable about a horizontal axis of said body such that a crown of the head can be positioned to a desired angle relative to the ground;
a hind leg attached to a rear portion of said body, said leg rotatable about a horizontal axis of said body rear portion;
said hind leg further comprised of an upper, generally horizontal member having a first end and a second end, a generally vertical member having a first end and a second end, and a lower, generally horizontal member having a first end and a second end; wherein said upper, generally horizontal member second end is attached to said generally vertical member first end, and said generally vertical member second end Is attached to said lower, generally horizontal member first end; and said upper, generally horizontal member first end is rotatably attached to said rear portion of said body.

18. A dummy for a roper to practice team roping comprising:
- a body shaped generally like a steer, said body having a front end and a back end;
- a head with horns attached to said body at the front end; and
- a rod having a length and width dimension, wherein the length is substantially greater than the width, the rod with a first end attached to said body at the front end, said rod extending vertically from said body, wherein a second end of said rod is higher than said horns and said head relative to a surface on which the dummy is positioned, and wherein said rod tends to cause the roper to adjust the roper's throw of the loop.

19. A dummy for a roper to practice team roping comprising:
- a body shaped generally like a steer, said body having a front end and a back end;
- a head attached to the front end of said body;
- horns attached to said head; and
- a rod having a length and width dimension, wherein the length is substantially greater than the width, the rod with a first end attached to said body at the front end, said rod extending vertically from said body, wherein a second end of said rod is higher than said horns and said head relative to a surface on which the dummy is positioned.

* * * * *